United States Patent [19]

Powell

[11] 4,444,342
[45] Apr. 24, 1984

[54] WAISTBAND POUCH

[76] Inventor: David J. Powell, 9252 San Jose Blvd., Jacksonville, Fla. 32217

[21] Appl. No.: 462,059

[22] Filed: Jan. 28, 1983

[51] Int. Cl.³ .............................................. A45F 5/02
[52] U.S. Cl. .................................... 224/252; 224/250
[58] Field of Search ............... 224/252, 269, 224, 919, 224/250; 2/250

[56] References Cited

U.S. PATENT DOCUMENTS

| | | | |
|---|---|---|---|
| 2,558,382 | 6/1951 | Previdi | 2/250 X |
| 3,320,620 | 5/1967 | Weidler et al. | 224/919 X |
| 4,044,933 | 8/1977 | Artz | 224/252 X |

FOREIGN PATENT DOCUMENTS 823409 11/1959 United Kingdom ................ 224/252

*Primary Examiner*—Steven M. Pollard
*Attorney, Agent, or Firm*—Arthur G. Yeager

[57] ABSTRACT

A detachable waistband pouch having a generally rectangular shape and a top opening which is selectively closable, a casing along the top front edge of the pouch and containing inside thereof an elastic strip to cause a gathering of the top edge of the pouch, a casing along the top edge of the back of the pouch, and a spring clip adapted to be retained in the casing on the back of the pouch with a portion of the clip outside of the pouch adapted to be fastened to the waistband of clothing. The pouch of this invention may be used to carry any small articles such as keys, golf balls, etc.

16 Claims, 9 Drawing Figures

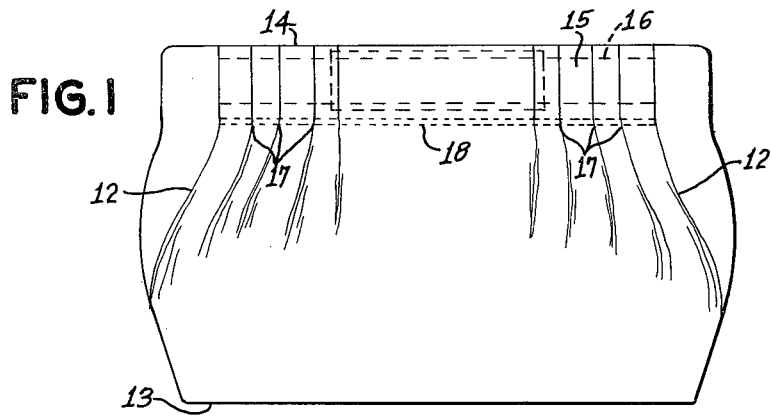
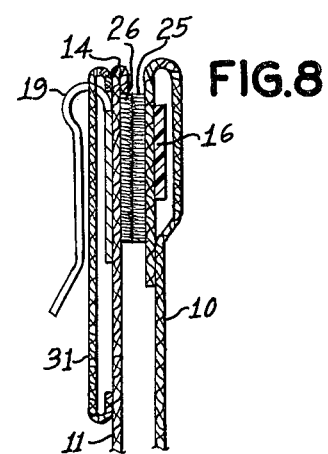
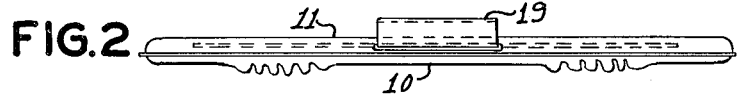
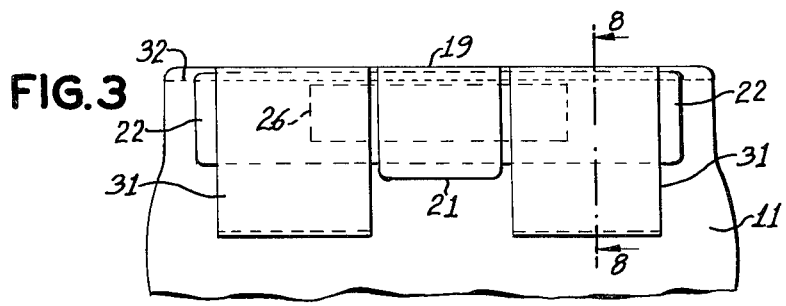
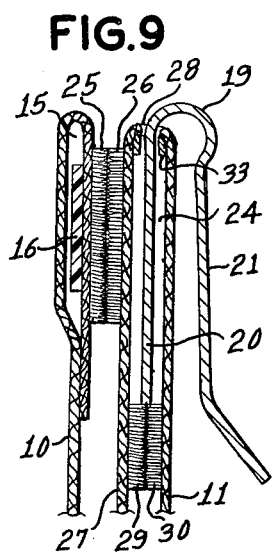
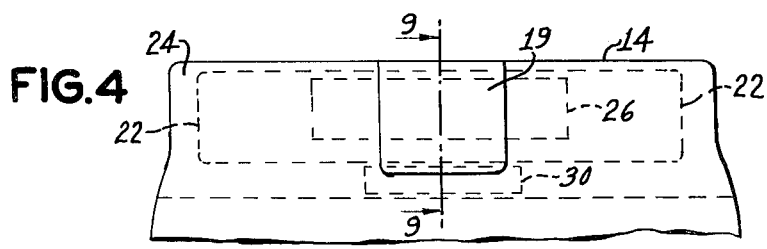
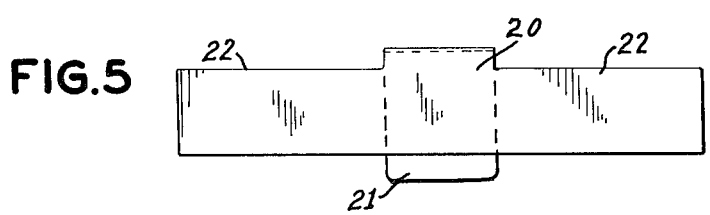
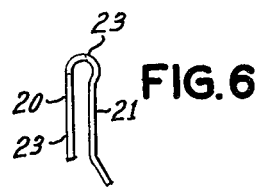
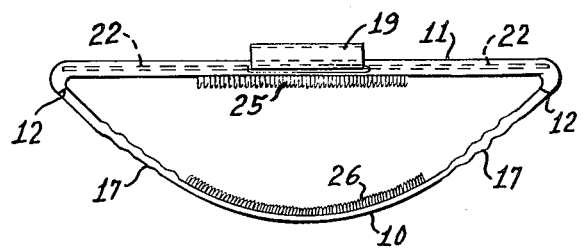

WAISTBAND POUCH

BACKGROUND OF THE INVENTION

This invention relates to a waistband pouch designed to be carried on the waistband of clothing for purposes of holding small articles.

There are many occasions when a person wishes to carry small articles in a container other than the pockets of the clothing, or alternatively, wishes to carry small articles when wearing clothing that have no pockets. In one such instance a golfer may wish to carry an extra golf ball, tees, a ball marker and a ball mark repairing tool but does not wish to carry these items in a pocket of the golfers clothing because to do so results in soiling the area around the pocket because of the repeated insertion of the golfers hand into the pocket. In the case of a female golfer the clothing may not have any pockets whatsoever and the need for a pouch to carry the various golfing articles is even more important. In another instance, a jogger or runner may wish to carry the keys to a house or car while exercising and the clothing of a jogger or runner may not be equipped with a pocket. In still another instance, a tennis player when serving must have access to two tennis balls and normally puts the second one in a pocket while serving the first one. This also results in the soiling of the area around the pocket because of the repeated use of the hand to insert or retrieve the dirty ball from the pocket. In the case of female tennis clothing there frequently are no pockets for such use.

In U.S. Pat. No. 2,558,382 there is described a pouch for use by golfer to hold extra golf balls, tees, and other articles. There are many features of this prior art device which are undesirable and it is an object of this invention to provide an improvement on such a pouch for a golfer. It is another object of this invention to provide waistband pouch of general utility, not being limited to use by a golfer. Still other objects will be apparent from the more detailed description of this invention which follows.

BRIEF DESCRIPTION OF THE INVENTION

This invention provides a detachable waistband pouch comprising a generally rectangular pouch having a front panel and a rear panel joined along two sides and along the bottom with the top being selectively openable and closeable, a spring clip having a body comprising a back portion and a front portion joined to each other along the top edge with a spring means tending to retain the respective bottom edges in close proximity to each other, said back portion having two arms extending laterally from said spring means, said rear panel having casing means for receiving said arms with said front portion of spring means extending outwardly of the casing means. In a specific embodiment of this invention the front panel has a casing along the top edge and an elastic strip therein producing a gathering at the top edge of the panel. In another specific embodiment the pouch is openable and closeable by reason of the two components of a VELCRO fastener attached to the respective inside top portions of the front panel and the rear panel of the pouch. In specific embodiment of this invention the arms of the spring clip are retained in a casing on the rear panel of the pouch, the casing being formed of a flap which is attached to the rear panel by the components of a VELCRO fastener. In still another embodiment of this invention the arms of the spring clip are retained in two belt loops attached to the rear panel of the pouch.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevation of the pouch of this invention.

FIG. 2 is a top plan view of the pouch of this invention.

FIG. 3 is a rear elevation of one embodiment of this invention.

FIG. 4 is a rear elevation of another embodiment of this invention.

FIG. 5 is a rear elevation of the spring clip of this invention.

FIG. 6 is a side elevation of the spring clip of this invention.

FIG. 7 is a top plan view of the pouch of this invention in an opened position.

FIG. 8 is a cross sectional view taken at 8—8 of FIG. 3.

FIG. 9 is a cross sectional view taken at 9—9 of FIG. 4.

DETAILED DESCRIPTION OF THE INVENTION

In FIGS. 1–6 there may be seen the general components of this invention and the improved features of this waistband pouch. When empty the pouch is generally rectangular in shape and thin enough to be worn on the waistband without obstructing the movement of the arms of the wearer during whatever activity may be involved. The pouch may be considered as having a front panel 10 and a rear panel 11 joined along the sides 12 and the bottom 13 to leave a top opening 14. Such a pouch may be prepared from fabric by cutting a strip approximately twice as long as either of panels 10 or 11, folding the panel to form bottom 13 at the fold and sewing the edges 12 together to form a seam on each side and thus producing a pouch with a top opening.

A casing 15 is formed along the top edge of front panel 10. Casing 15 may, for example, be formed by simply folding a portion of the cloth of the pouch back upon itself and stitching the folded fabric to front panel 10 parallel to the top edge of the pouch as is shown at 18. Inside of casing 15 is fastened an elastic strip 16 in a stretched condition so that when it is released it will form gathering of the material of front panel 10 as shown at 17. As will be apparent to those skilled in the art of tailoring the appropriate attachment of elastic strip 16 to front panel 10 will permit top 14 to open widely (as shown in FIG. 7) when strip 16 is stretched and, conversely, will hold top 14 closed when elastic strip 16 is released to produce the gathering of front panel 10 at 17.

Rear panel 11 is formed with a casing means, which may take on different embodiments, in order to contain a spring clip 19 which attaches the pouch of this invention to the waistband of the wearer. In the embodiment shown in FIG. 3 rear panel 11 is simply hemmed at the top edge by stitching 32 and two tunnel belt loops 31 are attached to the outside of rear panel 11. Spring clip 19 which is retained by belt loops 31 is shown in FIGS. 5 and 6 and may be made of plastic or metal, preferably steel. The clip comprises a back portion 20 attached to a front portion 21 by a spring means, which in this instance is merely a doubled back portion which provides a spring action to retain the lower edges of portions 20 and 21 in close proximity to each other. An alternative procedure would be to join portions 20 and 21 along their top edges with a hinge means which is biased by a spring placed around a hinge to maintain the bottom edges of portions 20 and 21 together. Attached to rear portion 20 as a separate piece or as an integral portion thereof are lateral arms 22 extending outwardly such that the overall distance from the end of one arm to the end of the other arm approximates the width of the pouch of this invention. Arms 22 may be inserted into belt loops 31 of FIG. 3 with front portion 21 of spring clip 19 available to be slid over a belt or a waistband of the clothing of the wearer. In the embodiment shown in FIG. 3 it is preferable if the spacing between tunnel belt loops 31 closely approximates the width of front portion 21 of spring clip 19 so as to prevent anymore than a minimum of sidewise movement of clip 19 with respect to rear panel 11.

In the embodiment shown in FIG. 4 a casing 24 is made from a flap of panel 11 extending beyond top 14 and folded back upon itself on the inside of the pouch. At the bottom central portion of the flap there is one component of a fastener device which cooperates with another component attached to the inside of rear panel 11 so that the flap when fastened forms a casing to enclose arms 22 of spring clip 19. A suitable fastening device is a fabric hook-fabric loop fastener, commonly referred to as a "VELCRO" fastener. The components of the fastener are shown in FIG. 4 at 30.

In order to maintain the opening at top 14 closeable and openable it is preferred to employ the component parts of "VELCRO" fastener at 26 attached to the inside portions of panels 10 and 11 respectively. These components may be pressed together to close the opening and manually pulled apart to open the opening in a fashion well known to most consumers. In the open position as shown in FIG. 7 there is room for the hand of the user to be inserted into the pouch to retrieve whatever article is desired, such as keys, golf ball, tee, ball marker, or a repair tool.

In FIG. 8 there is shown a cross section taken at 8—8 of FIG. 3 indicating how the spring clip 19 is held inside of belts loops 31, and also how fabric hooks 25 attached to front panel 10 may cooperate with fabric loops 26 attached to rear panel 11 to maintain top 14 in a closed position.

In FIG. 9 there is shown an enlarged cross sectional view taken at 9—9 of FIG. 4. Here it may be seen how flap 27 extends beyond the upper edge of panel 11 and is folded back upon itself and attached through the cooperation of fabric hooks 29 and fabric loops 30 to rear panel 11. Spring clip 19 can then be held in casing 24 formed thereby enclosing arms 22 of clip 19. In order for the front portion 21 of clip 19 to be exposed there is formed a buttonhole 28 at the top edge of rear panel 11 of sufficient size for front portion 21 to be passed therethrough. Because bottonhole 28 will receive a certain amount of stress it is preferable that a reinforcement layer 33 be attached to the inside surface around the edges of buttonhole 28. A suitable reinforcement is a fibrous layer known as "PELLON" backing material. There is also shown fabric loop portion 26 and fabric hook portion 25 cooperating to close the opening at the top of the pouch. Casing 15 is shown containing elastic strip 16 which produces gatherings 17 when released from any tension. It may be seen that when top 14 is pulled open as shown in FIG. 7 gatherings 17 substantially disappear because of the stretched condition of elastic strip 16. Front portion 21 of clip 19 is slipped over the top of a belt or the waistband of a pair of slacks or a skirt or a pair of shorts in order to attach the pouch of this invention to the clothing of a wearer.

In another embodiment of this invention casing 15 and enclosed elastic strip 16 may be eliminated, and in order to keep the top edges openable and closeable the component parts of a VELCRO fastener are extended completely across the top edges of front panel 10 and rear panel 11 from one side 12 to the other side 12.

The pouch of this invention may be made of any of variety of materials such as leather, fabric, plastic, etc. It is preferable that the material be a cloth fabric that is readily sewn or fabricated with adhesives to form the casings as described with respect to this invention. The pouch of this invention may be any convenient size but it has been found to be desirable to be about 3–5 inches in vertical height and about 4–6 inches in horizontal width. Smaller sizes may be more suitable for the jogger to carry keys while larger sizes may be more suitable for a tennis player to use as a temporary receptable for the second tennis ball to be used in the serve. Intermediate sizes are eminently suitable for a golfer to carry one or two golf balls and a suitable assortment of tees, markers, and repair tools.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A detachable waistband pouch comprising a generally rectangular pouch having a front panel and a rear panel joined along two sides and along the bottom with the top being selectively openable and closeable, a spring clip having a body comprising a back portion and a front portion joined to each other along the top edge with a spring means tending to retain the respective bottom edges in close proximity to each other, said back portion having two arms extending laterally from said spring means, said rear panel having casing means for releaseably receiving said arms with said front portion of the spring means extending outwardly of the casing means.

2. The pouch of claim 1 wherein said front panel has a casing along the top edge thereof and an elastic strip inside the casing to produce gathering along said top edge.

3. The pouch of claim 1 wherein the top of said pouch is openable and closeable by means of cooperating components of a fastener comprising fabric loops and fabric hooks.

4. The pouch of claim 3 wherein said fastener is a VELCRO fastener.

5. The pouch of claim 1 wherein said spring clip is a solid unitary article comprising a doubled back strip of rigid material.

6. The pouch of claim 1 wherein said rear panel includes a flap adjacent the top edge thereof adapted to be folded back upon itself and enclose said arms of the spring clip, and a button-hole through said flap to accommodate said body of the spring clip therethrough.

7. The pouch of claim 6 wherein said flap includes a means to fasten the flap to the inside of said rear panel.

8. The pouch of claim 7 wherein said means to fasten consists of a fabric hook member and a fabric loop member adapted to cooperate to produce a releaseable fastener.

9. The pouch of claim 8 wherein said fabric hook member and said fabric loop member are component parts of a VELCRO fastener.

10. The pouch of claim 1 wherein said rear panel includes two belt loops spaced apart sufficiently to accommodate said body of said spring clip therebetween and to receive said arms inside of said belt loops.

11. A pouch for detachable attachment to the waistband of clothing including a flexible fabric pouch with a top opening and a spring clip releaseably attached thereto and adapted to be attached to the waistband of clothing; the improvement which comprises a spring clip having a body portion with two legs biased toward each other and two lateral arms extending transversely outwardly from said body portion, a pouch having a top opening defined by a front edge and a rear edge joined to each other at the ends of each edge, a casing adjacent said front edge, an elastic strip inside said casing adapted to cause gathering of said fabric along said front edge, a casing adjacent said rear edge adapted to releaseably enclose said lateral arms and to permit at least one of said legs to extend outwardly of said pouch.

12. The pouch of claim 11 wherein said spring clip comprises a vertical front portion and a transversely elongated horizontal rear portion joined together through a redoubled spring bend portion which biases said front portion toward said rear portion.

13. The pouch of claim 11 which includes adjacent said front edge and said rear edge, respectively, cooperating components of a fabric hook/fabric loop fastener adapted to releaseably close said top opening.

14. The pouch of claim 11 wherein said casing adjacent said rear edge comprises a flap releaseably attached to said pouch.

15. The pouch of claim 14 wherein said flap is releaseably attached to said pouch by cooperating components of a fabric hook/fabric loop fastener.

16. The pouch of claim 11 wherein said casing adjacent said rear edge comprises two belt loops spaced apart substantially the horizontal width of said body portion of said spring clip and adapted to receive internally thereof said two lateral arms, respectively.

* * * * *